United States Patent
Kuo et al.

(10) Patent No.: US 9,973,232 B1
(45) Date of Patent: May 15, 2018

(54) LOW SPECIFIC ABSORPTION RATE (SAR) DUAL-BAND ANTENNA STRUCTURE

(71) Applicant: AMAZON TECHNOLOGIES, INC., Reno, NV (US)

(72) Inventors: Jerry Weiming Kuo, San Jose, CA (US); Ming Zheng, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 287 days.

(21) Appl. No.: 14/298,470

(22) Filed: Jun. 6, 2014

(51) Int. Cl.
*H04B 1/50* (2006.01)

(52) U.S. Cl.
CPC ..................... *H04B 1/50* (2013.01)

(58) Field of Classification Search
CPC ............ H01Q 7/00; H01Q 9/42; H01Q 21/30; H01Q 9/30; H01Q 21/24
USPC ......................................................... 343/728
See application file for complete search history.

(56) References Cited

U.S. PATENT DOCUMENTS

| | | | | |
|---|---|---|---|---|
| 5,442,368 A * | 8/1995 | Harada | ..................... | H01Q 7/00 343/713 |
| 7,205,942 B2 * | 4/2007 | Wang | ..................... | H01Q 1/243 343/700 MS |
| 7,667,651 B2 * | 2/2010 | McKivergan | ............ | H01Q 7/00 343/700 MS |
| 9,350,077 B1 * | 5/2016 | Zheng | ....................... | H01Q 7/00 |
| 2004/0232776 A1 * | 11/2004 | Ozaki | ................ | G01R 29/0878 307/149 |
| 2007/0040756 A1 * | 2/2007 | Song | .................... | H01Q 13/106 343/713 |
| 2011/0063180 A1 * | 3/2011 | Su | ........................... | H01Q 3/24 343/795 |

FOREIGN PATENT DOCUMENTS

WO    WO2011076582 A1 *   6/2011   ............... H01Q 1/24

OTHER PUBLICATIONS

Rastislav Galuščák, Pavel Hazdra, "Dual-band Loop Feed with Enhanced Performance" Radio Engineering, vol. 17, No. 3, Sep. 2008.

* cited by examiner

*Primary Examiner* — Jessica Han
*Assistant Examiner* — Bamidele A Jegede
(74) *Attorney, Agent, or Firm* — Lowenstein Sandler LLP

(57) ABSTRACT

Dual-band antenna structures and methods of operating the same of an electronic device are described. One apparatus includes a radio frequency (RF) feed and a dual-band antenna structure coupled to the RF feed at a feeding point and coupled to a ground plane at a grounding point. The structure includes a first loop antenna and a second loop antenna, both coupled to the feeding point and the grounding point. The first loop antenna radiates electromagnetic energy in a first resonant mode in a first frequency band and the second loop antenna radiates electromagnetic energy in a second resonant mode in a second frequency band and radiates electromagnetic energy in a third resonant mode in the first frequency band. Surface currents create three or more hot spots of magnetic field.

23 Claims, 10 Drawing Sheets ps, a second hot spot at the grounding point, a third hot spot at a first edge of the second loop antenna and a fourth hot spot at a second edge of the second loop antenna, as described herein. The dual-band antenna structure can be used for Long Term Evolution (LTE) frequency bands, third generation (3G) frequency bands, Wi-Fi® and Bluetooth® frequency bands or other wireless local area network (WLAN) frequency band, wide area network (WAN) frequency bands, global positioning system (GPS) frequency bands, or the like.

LOW SPECIFIC ABSORPTION RATE (SAR) DUAL-BAND ANTENNA STRUCTURE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

All consumer portable devices need to meet the FCC's SAR requirement. SAR is a measure of the rate at which energy is absorbed by the body when exposed to a radio frequency (RF) electromagnetic field. In addition, the user's body can block the RF electromagnetic field in the direction of the user's body, thus reducing the gain in that direction.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
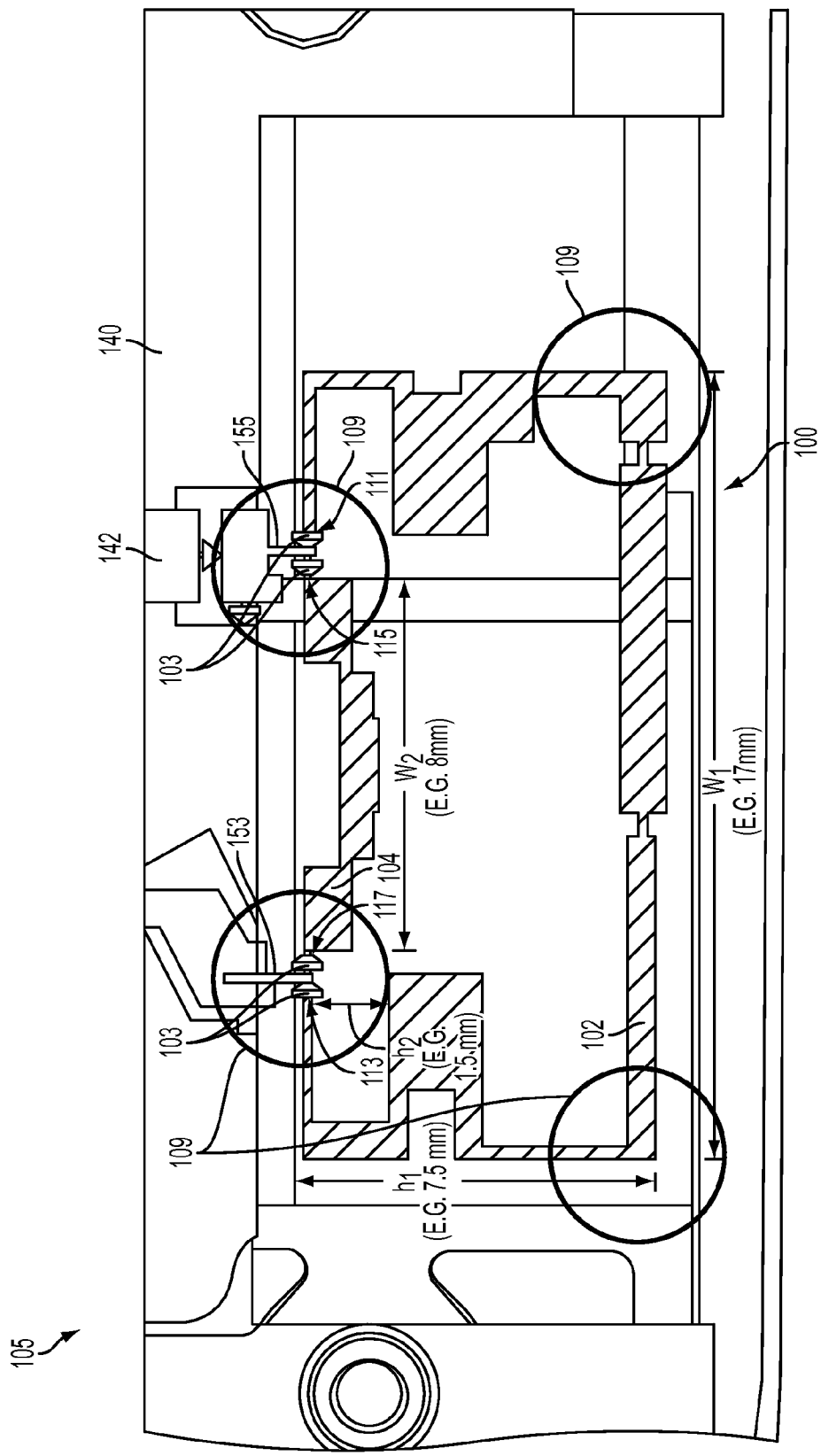
FIG. 1 is a rear view of a user device of a dual-band antenna structure including two loop elements according to one embodiment.

Dual-band antenna structures and methods of operating the same of an electronic device are described. One apparatus includes a radio frequency (RF) feed and a dual-band antenna structure coupled to the RF feed at a feeding point and coupled to a ground plane at a grounding point. The dual-band antenna structure includes a first loop antenna coupled to the feeding point and the grounding point and a second loop antenna coupled to the feeding point and the grounding point. The first loop antenna and the second loop antenna may be planar loop antennas that lie in a single plane which may also contain the conductors of the RF feed. Alternatively, the first loop antenna and the second loop antenna can be three-dimensional loop antennas. A loop antenna has a continuous conducting path leading from one conductor (e.g., the RF feed) to another conductor (e.g., the ground plane). When RF signals are applied to the RF feed, the first loop antenna radiates electromagnetic energy in a first resonant mode in a first frequency band and the second loop antenna radiates electromagnetic energy in a second resonant mode in a second frequency band of the dual-band antenna structure and radiates electromagnetic energy in a third resonant mode in the first frequency band. The first frequency band is higher than the second frequency band. Surface currents generated due to the RF signals applied at the feeding point create three or more hot spots of magnetic field. The three or more hot spots are areas on the dual-band antenna structure at which surface-current density is higher than on an area surrounding the three or more hot spot areas. Hot spots of magnetic field may also be referred to as surface-current hot spot.

In one embodiment, a first hot spot of the three or more hot spots is located near the feeding point, a second hot spot of the three or more hot spots is located near the grounding point, and one or more hot spots of the three or more hot spots are located at a distance from the grounding point and the feeding point, for example, at least five millimeters (5 mm) away. In another embodiment, there are four hot spots of magnetic field created: a first hot spot at the feeding point, a second hot spot at the grounding point, a third hot spot at a first edge of the second loop antenna and a fourth hot spot at a second edge of the second loop antenna, as described herein. The dual-band antenna structure can be used for Long Term Evolution (LTE) frequency bands, third generation (3G) frequency bands, Wi-Fi® and Bluetooth® frequency bands or other wireless local area network (WLAN) frequency band, wide area network (WAN) frequency bands, global positioning system (GPS) frequency bands, or the like.

The electronic device (also referred to herein as user device) may be any content rendering device that includes a transceiver for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

SAR is dependent on the average power transmitted. Power throttling can be used to back off the average power transmitted to ensure that the device complies with FCC regulations concerning radiation absorbed by human tissue, also referred to as SAR requirements. A procedure known as SAR testing quantifies this absorbed radiation. A SAR number is obtained while testing the device in close proximity to a phantom (e.g., gel) that simulates the RF properties of human tissue while it is transmitting at full power. To comply with FCC regulations, some devices use proximity sensors to sense a proximity to tissue and reduce the power accordingly. The embodiments described herein utilize the dual-band antenna structure design to reduce SAR when the user device is in proximity to a person (e.g., a human body part) or a SAR phantom (hereinafter "phantom") as used during testing of SAR for the user device to comply with FCC regulation. For example, the embodiments described herein can minimize SAR by dispersing portions of the surface currents to create three or more hot spots of magnetic field that are spread apart or scattered to reduce the amount of radiation within any cubic volume of the antenna structure. The hot spots are areas on the dual-band antenna structure at which surface-current density is higher than on an area surrounding the three or more hot spot areas.

FIG. 1 is a rear view of a user device 105 of a dual-band antenna structure 100 according to one embodiment. The dual-band antenna structure 100 includes two loop antennas. The first loop antenna is an inner loop element 104 and the second loop antenna is an outer loop element 102. The outer loop element 102 and inner loop element 104 are coupled to a RF feed 142 at a feeding point 155 and are coupled to a ground plane 140 at a grounding point 153. The ground plane 140 may be a metal frame of the user device 105, such as a system ground or one of multiple grounds of the user device 105. The RF feed 142 of the user device 105 carries RF signals to and/or from the dual-band antenna structure 100 and the radio circuitry of the user device 105. The RF feed 142 may be a feed line connector that couples the dual-band antenna structure 100 to a respective transmission line of the user device 105. The RF feed 142 is a physical connection that carries the RF signals to and/or from the dual-band antenna structure 100 and the circuitry of the user device 105. The feed line connector may be any one of the three common types of feed lines, including coaxial feed lines, twin-lead lines or waveguides. A waveguide, in particular, is a hollow metallic conductor with a circular or square cross-section, in which the RF signal travels along the inside of the hollow metallic conductor. Alternatively, other types of connectors can be used.

The user device 105 may also include an impedance matching network including multiple impedance-matching components 103. The impedance-matching components 103 may include capacitors, inductors, or conductive traces having capacitances or inductances. The impedance-matching components 103 may be coupled in series between the RF feed 142, the feeding point 155, the grounding point 153, the outer loop element 102, and the inner loop element 104.

The outer loop element 102 is coupled to the RF feed at the feeding point 155 at a near end 111 of the outer loop element 102 and coupled to the ground plane 140 at the grounding point 153 at a distal end 113 of the outer loop element 102, the distal end 113 being the farthest end from the RF feed 142. The inner loop element 104 is coupled to the RF feed 142 at the feeding point 155 at a near end 115 of the inner loop element 104 and coupled to the ground plane 140 at the grounding point 153 at a distal end 117 of the inner loop element 104, the distal end 117 being the farthest end from the RF feed 142. It should be noted that the distal end 113 and 117 are not the farthest remote point on the respective loop element, but they represent the farthest point away from the RF feed 142 when traversing around the respective loop element from the feeding point 155 to the grounding point 153. There are at least two distances which define the "notion of size" in a loop antenna. These are, the total length of loop element between the feeding point 155 and the grounding point 153 (traversing along the element from the feeding point 155 to the grounding point 153), as well as the largest distance from one point on the loop element to another, measured in a straight line (e.g., one corner of a rectangle shape of a coplanar loop antenna structure to a diagonally opposite corner of the rectangle shape of the coplanar loop antenna structure as illustrated in FIG. 1). Another distance of a loop antenna is the distance from the feeding point 155 to the most remote point on the loop element. All of these distances can be expressed in terms of units of wavelength at the carrier frequency handled by the antenna structure.

The inner loop element 104 is disposed at least partially within an inner area defined by the outer loop element 102. As illustrated in FIG. 1, the outer loop element 102 and the inner loop element 102 form a substantially rectangular shape in which the inner loop element 102 forms a portion of one side of the rectangular between the feeding point 155 and the grounding point 153, whereas the outer loop element 104 forms the rest of the one side and the other three sides of the rectangle. As illustrated, the inner loop element 102 has a slight bend between the feeding point 155 such that a center point of the inner loop element 102 is farther away from a linear axis between the feeding point 155 and the grounding point 153. The feeding point 155 and the grounding point 153 are at a specified distance apart, such as at least 5 mm apart. Alternatively, other distances between the feeding point 155 and the grounding point 153 may be used.

In the depicted embodiment, the outer loop element 102 has a U shape with two ends and two junctions. The outer loop element 102 includes a first arm portion that extends from the feeding point 155 to a first junction in a first direction, a second arm portion that extends from the first junction in a second direction towards a second junction, a third arm portion that extends from the second junction in a third direction towards a third junction, a fourth arm portion that extends from the third junction in a fourth direction towards a fourth junction, and a fifth arm portion that extends from the fourth junction in the first direction towards the grounding point 153. The first arm portion, the third arm portion and the fifth arm portion are parallel to the ground plane 140. The second arm portion and the fourth arm portion are perpendicular to the ground plane 140. It should be noted that a "junction" or "fold" refers to a bend, a corner or other change in direction of the antenna element. For example, the junction may be where one segment of an antenna element changes direction in the same plane or in a different plane. Typically, junctions or folds in antennas can be used to fit the entire length of the antenna within a smaller area or smaller volume of a user device. The dual-band antenna structure 100 can be formed by using one or more conductive traces on a printed circuit board, metal traces disposed on the antenna carrier, or the like.

In one embodiment, dual-band antenna structure 100 is disposed on an antenna carrier (not illustrated), such as a dielectric carrier of the user device 105. The antenna carrier may be any non-conductive material, such as dielectric material, upon which the conductive material of the dual-band antenna structure 100 can be disposed without making electrical contact with other metal of the user device. In another embodiment, the dual-band antenna structure 100 is disposed on, within, or in connection with a circuit board, such as a printed circuit board (PCB). In one embodiment, the ground plane 140 may be a metal chassis of a circuit board. Alternatively, the dual-band antenna structure 100 may be disposed on other components of the user device or within the user device (or of or within other electronic devices). It should be noted that the dual-band antenna structure 100 illustrated in FIG. 1 is a two-dimensional (2D) structure. However, as described herein, dual-band antenna structure 100 may include three-dimensional (3D) structures, as well as other variations than those depicted in FIG. 3. The dual-band antenna structure 100 is designed to fit in a smaller volume or area (e.g., 10 mm×26 mm) while maintaining the overall length of the antenna elements. The embodiments of the dual-band antenna structure 100 can be used in compact devices with space constraints. For example, in one embodiment, the dual-band antenna structure 100 fits within an area of 10 mm height and 26 mm width in a cut out of the ground plane 140. This area can still accommodate additional components of the user device. In other embodiments, smaller or larger areas or volumes can be used.

The dimensions of the dual-band antenna structure 100 may be varied to achieve the desired frequency range as would be appreciated by one of ordinary skill in the art having the benefit of this disclosure, however, the total length of the antennas is a major factor for determining the frequency, and the width of the antennas is a factor for impedance matching. It should be noted that the factors of total length and width are dependent on one another. The dual-band antenna structure 100 may have various dimensions based on the various design factors. The outer loop element 102 has an effective length that is roughly the distance between the feeding point 155 along the conductive trace(s) to the grounding point 153. In the depicted embodiment, an antenna area of the outer loop element 102 is approximately 7.5 millimeters (mm) in height ($h_1$) and 17 mm in width ($W_1$). An antenna area of the inner loop element 104 is approximately 1.5 millimeters (mm) in height ($h_2$) and 8 mm in width ($W_2$). Of course, other variations of layout and shapes may be used for the dual-band antenna structure 100. For example, the dual-band antenna structure 100 can have various bends, such as to accommodate placement of other components, such as a speakers, microphones, USB ports. The dual-band antenna structure 100 may also include one or more extension sections and tuning sections as described below with respect to FIG. 5.

Figure 2:
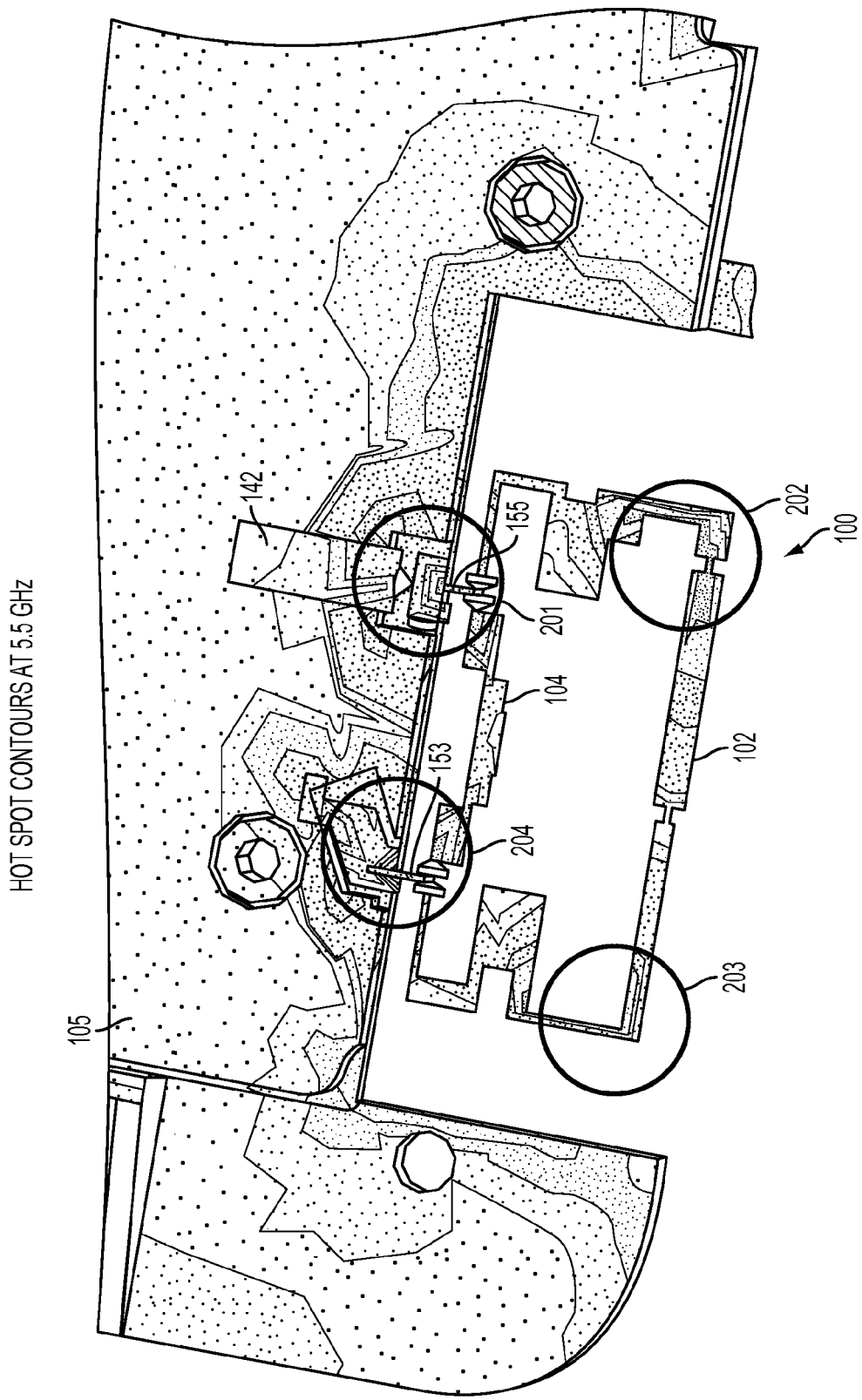
FIG. 2 illustrates hot spot contours of magnetic field caused by the dual-band antenna structure of FIG. 1 according to one embodiment.

During operation, the RF feed 142 applies current to the outer loop element 102 and the inner loop element 104. The outer loop element 102 and inner loop element 104 radiates magnetic field. As shown in FIG. 2, the outer loop element 102 and inner loop element 104 create four hot spots 109 of magnetic field in a first high band (e.g., 5.5 GHz) of the dual-band. The hot spots 109 are areas of the outer loop element 102 and the inner loop element 104 that have higher surface-current densities than other surrounding areas of the outer loop element 102 and inner loop element 104. That is, surface currents create four hot spots 109 of magnetic field, the four hot spots 109 being areas on the dual-band antenna structure at which surface-current density is higher than on an area surrounding the four hot spot areas. In the depicted embodiment, as illustrated in FIG. 2, a first hot spot near the feeding point 155, a second hot spot near the grounding point 153, a third hot spot near a first one of the two junctions of the U-shape section, and a fourth hot spot near a second of the two junctions of the U-shape section. It should be noted that are two hot spots created in a second low band (e.g., 2.44 GHz) of the dual-band. These two hot spots are located at the feeding point 155 and the grounding point 153 similar to the first and second hot spots in the first high band illustrated in FIG. 2.

In one embodiment, the inner loop element 104 radiates electromagnetic energy in a first quarter-wave ($\lambda/4$) resonant mode in a high band (first band) of the dual-band antenna structure 100 when the RF signals are applied to the RF feed 142. Lamba ($\lambda$) represents a length of one electromagnetic wave of a frequency at which an antenna radiates electromagnetic energy; thus, $\lambda/4$ is a quarter wavelength. References to operating in one or more resonant modes indicates that the characteristics of an antenna structure, such as length, position, width, proximity to other elements, ground, or the like, decrease a reflection coefficient at a frequency range, such as at the first high band (e.g., 5.5 GHz). The outer loop element 102 radiates electromagnetic energy in a second quarter-wave ($\lambda/4$) resonant mode in a low band (second band) of the dual-band antenna structure 100 and radiates electromagnetic energy in a third three-quarters-wave ($3/4\lambda$) resonant mode in the high band (first band) of the dual-band antenna structure 100 when the RF signals applied to the RF feed 142. In one embodiment, the first quarter-wave ($\lambda/4$) resonant mode is centered at approximately 2.44 GHz, the second quarter-wave resonant mode ($\lambda/4$) is centered at approximately 5.1 GHz, and the third three-quarters-wave ($3/4\lambda$) resonant mode is centered at approximately 5.6 GHz. In another embodiment, the first loop antenna and the second loop are quarter-wave antennas, and the first frequency band is approximately 2.3 GHz to approximately 2.6 GHz and the second frequency band is approximately 4.9 GHz to approximately 5.9 GHz. In some scenarios, it can be said that outer loop element 102 operates in working principle as a folded monopole structure, but the loop element disperses portions of the surface currents at the feeding point 144 and the grounding point 153 to create additional hot spots as described herein.

The embodiments described herein are not limited to use in these frequency ranges, but could be used in one or more frequency bands or frequency ranges, as described herein. The dual-band antenna structure 100 may be configured to operate in multiple resonant modes. For example, in another embodiment, the dual-band antenna structure may include one or more additional arm elements, slot antennas in the dual-band antenna structure or notches to create one or more additional resonant modes. In another embodiment, the dual-band antenna structure may include additional elements, such as a parasitic ground element (e.g., a monopole element that extends from the ground plane that closely couples to the other antenna elements), to create an additional resonant mode. For example, the dual-band antenna structure 100 can be used in wireless local area network (WLAN) frequency bands. Alternatively, the dual-band antenna structure 100 can be used in one or more of the following frequency bands Long Term Evolution (LTE) 700 (band 17), 1800 (band3) 2600 (band 7) etc., Universal Mobile Telecommunications System (UMTS) (also referred to as Wideband Code Division Multiple Access (WCDMA)) and Global System for Mobile Communications (GSM) 850, GSM 900, GSM 1800 (also referred to as Digital Cellular Service (DCS) 1800) and GSM 1900 (also referred to as Personal Communication Service (PCS) 1900). The dual-band antenna structure 100 may be configured to operate in multiple resonant modes. References to operating in one or more resonant modes indicates that the characteristics of the dual-band antenna structure, such as length, position, width, proximity to other elements, ground, or the like, decrease a reflection coefficient at certain frequencies to create the one or more resonant modes as would be appreciated by one of ordinary skill in the art. Also, some of these characteristics can be modified to tune the frequency response at those resonant modes, such as to extend the bandwidth, decrease the reflection coefficient, or the like. The embodiments described herein also provide a dual-band antenna structure in a size that is conducive to being used in a compact user device.

In the depicted embodiment, the impedance-matching components 103 include a first component coupled in series between the feeding point 155 and the first arm portion, a second component coupled in series between the fifth arm and the grounding point 153, a third component coupled in series between the feeding point 155 and a first end of the inner loop element 104, a fourth component coupled in series between the grounding point 153 and a second end of the inner loop element 104, and a fifth component coupled between the feeding point 155 and the ground plane 140. These components can be discrete components, distributed components, as well as conductive traces with capacitive or inductive properties. The first component may be a very small loss resistor, such as 0.1 ohms resistor or a short. The second component may be a capacitor, such as a 3 pF capacitor. The third component and fourth components may be capacitors, such as 2 pF capacitors. The fifth component may be an inductor, such as a 3.5 nH inductor. Alternatively, other configurations of components and other capacitances and inductances may be used for the impedance-matching components 103.

In another embodiment, the dual-band antenna structure includes a first loop antenna coupled to the feeding point and the grounding point and a second loop antenna coupled to the feeding point and the grounding point. When RF signals are applied to the RF feed, the first loop antenna radiates electromagnetic energy in a first resonant mode in a first frequency band and the second loop antenna radiates electromagnetic energy in a second resonant mode in a second frequency band of the dual-band antenna structure and radiates electromagnetic energy in a third resonant mode in the first frequency band. The first frequency band is higher than the second frequency band. When the RF signals are applied to the RF feed, the dual-band antenna structure creates three or more hot spots of magnetic field, the three or more hot spots being areas on the dual-band antenna structure at which surface-current density is higher than on an area surrounding the three or more hot spot areas. A first hot spot of the three or more hot spots is located near the feeding point. A second hot spot of the three or more hot spots is located near the grounding point. One or more hot spots of the three or more hot spots are located at a distance (e.g., at least 5 mm away) from the grounding point and the feeding point.

In one embodiment, the first loop antenna and the second loop are quarter-wave antennas, and wherein the first frequency band is approximately 2.3 GHz to approximately 2.6 GHz and the second frequency band is approximately 4.9 GHz to approximately 5.9 GHz. In another embodiment, the first resonant mode is centered at approximately 5.1 GHz, the second resonant mode is centered at approximately 2.44 GHz, and the third resonant mode is centered at approximately 5.6 GHz.

In a further embodiment, the second loop antenna comprises a U-shape outer-loop structure comprising a first end coupled to the feeding point, a second end coupled to the grounding point, a first junction, and a second junction. The first loop antenna is disposed at least partially within an inner area defined by the U-shape outer-loop structure. The one or more hot spots include a third hot spot located near the first junction of the U-shape outer-loop structure and a fourth hot spot located near the second junction of the U-shape outer-loop structure.

In a further embodiment, surface currents applied at the feeding point create the first hot spot at the feeding point and the second hot spot at the grounding point and the U-shape outer loop structure disperses a portion of the surface currents at the feeding point and a portion of the surface currents at the grounding point to create the third hot spot and the fourth hot spot.

FIG. 2 illustrates hot spot contours of magnetic field caused by the dual-band antenna structure 100 of FIG. 1 according to one embodiment. The four hot spots 109 referred to above include a first hot spot 201, a second hot spot 202, a third hot spot 203 and a fourth hot spot 204. The first hot spot 201 is located near the feeding point 155. The second hot spot 202 is located near a first junction of the outer loop element 102. The third hot spot 203 is located near a second unction of the outer loop element 102. The fourth hot spot 204 is located near the grounding point 153. The hot spot contours of magnetic field of FIG. 2 are when the dual-band antenna structure 100 is driven at 5.5 GHz. The four hot spots 201-204 are in similar locations throughout the desired frequency ranges of 2.4 GHz to 2.5 GHz and 5.2 GHz to 5.8 GHz, as described herein. As illustrated in FIG. 2, the dual-band antenna structure 100 has two launch points effectively. One launch point is at the feeding point 155 of the RF feed 142 and the other launch point is at the grounding point 153 where the outer loop element 102 and inner loop element 104 are coupled to the ground plane 140. The two launch points result in two hot spots 201, 204. The use of the two loop antenna structure (e.g., outer loop element 102 and inner loop element 104) and corresponding impedance-matching components 103 disperses portions of the surface currents to create two additional hot spots 202, 203, reducing the overall SAR value within any given 1 g tissue area (e.g., ten by ten by ten millimeter (10×10×10 mm) volume within the antenna area. As illustrated, the second and third hot spots 202 and 203 are located away from the feeding point 155 and the grounding point 153 by a distance of at least 5 mm. The hot spots 201-204 have higher surface-current density than surrounding areas. The surface-current density decreases as a function of distance away from a center area of the respective hot spot. The four hot spots 201-204 are spread out enough that the overall radiation in any given cubic volume near the antenna structure is reduced for SAR testing.

The embodiments described herein are low SAR antennas that reduce an antenna's SAR values. The dual-band antenna structure 100, including the two loop elements, can be used to meet the SAR requirement described above where SAR is tested at 0 mm distance between the user device and the phantom. In particular, the dual-band antenna structure 100 of FIG. 1 can result in a SAR value lower than 1.6 w/kg at 2.44 GHz with nominal RF power (e.g., 13 dBm or 0.02 Watts) in a slant position. The reduced SAR value can allow the dual-band antenna structure 100 to operate a higher transmit power, resulting in better communication coverage. The higher transmit power and better communication coverage can result in a better user experience of the user device. For some SAR tests, the user device 105 needs to be tested at 0 mm distance between the user device 105 and a phantom and result in a SAR value lower than 1.6 w/kg at 2.44 GHz and 5.5 GHz with nominal RF power (e.g., 13 dBm or 0.02 Watts in a slant position). The dual-band antenna structure 100, illustrated in FIG. 1, results in 0.56 w/kg at 2.44 GHz, and 1.55 w/kg at 5.5 GHz, below the FCC limit with 13 dBm accepted power. Between 5.2 GHz and 5.8 GHz, the SAR values are less than 1.55 w/kg. These tests also assume that the distance from the area of the RF feed 142 to the back of the user device 105 is less than 4.3 mm.

Low SAR antennas, such as the dual-band antenna structure 100 of FIG. 1, are attractive options for tablet devices and wearable electronics. By reducing SAR values in the dual-bands of 2.44 GHz and 5.5 GHz, higher transmission power can be used, particularly in the 5.5 GHz band. The higher transmission power increases throughput in the frequency band. For example, dual-band WLAN frequency bands, such as dual-band Wi-Fi® bands, need to cover 2.4 GHz to 2.5 GHz and 5.2 GHz to 5.8 GHz. The embodiments described herein can be used to communicate in the dual-band WLAN frequency bands, such as the dual-band Wi-Fi® bands. The high-band (e.g., 5.2-5.8 GHz) is a wider bandwidth that usually needs to be covered by multiple resonant modes. The dual-band antenna structure 100 can be used to provide multiple resonant modes in the high-band, as well as a resonant mode in the low-ban (e.g., 2.4-2.5 GHz). In particular, the inner loop element 104 radiates for the high-band with lower SAR properties and the outer loop element 102 radiates the low-band with lower SAR properties. The outer loop element 102 also radiates with another resonant mode in the high-band, increasing the bandwidth in the high-band.

In one embodiment, an electronic device includes a transceiver to transmit or receive RF signals, a RF feed coupled to the transceiver, and a dual-band antenna structure coupled to the RF feed. The dual-band antenna structure includes a ground plane and an outer loop element coupled to the RF feed at a feeding point at near end of the outer loop element and coupled to the ground plane at a grounding point at a distal end of the outer loop element 102, the distal end being the farthest end from the RF feed. Surface currents create four hot spots as described herein.

Figure 3:
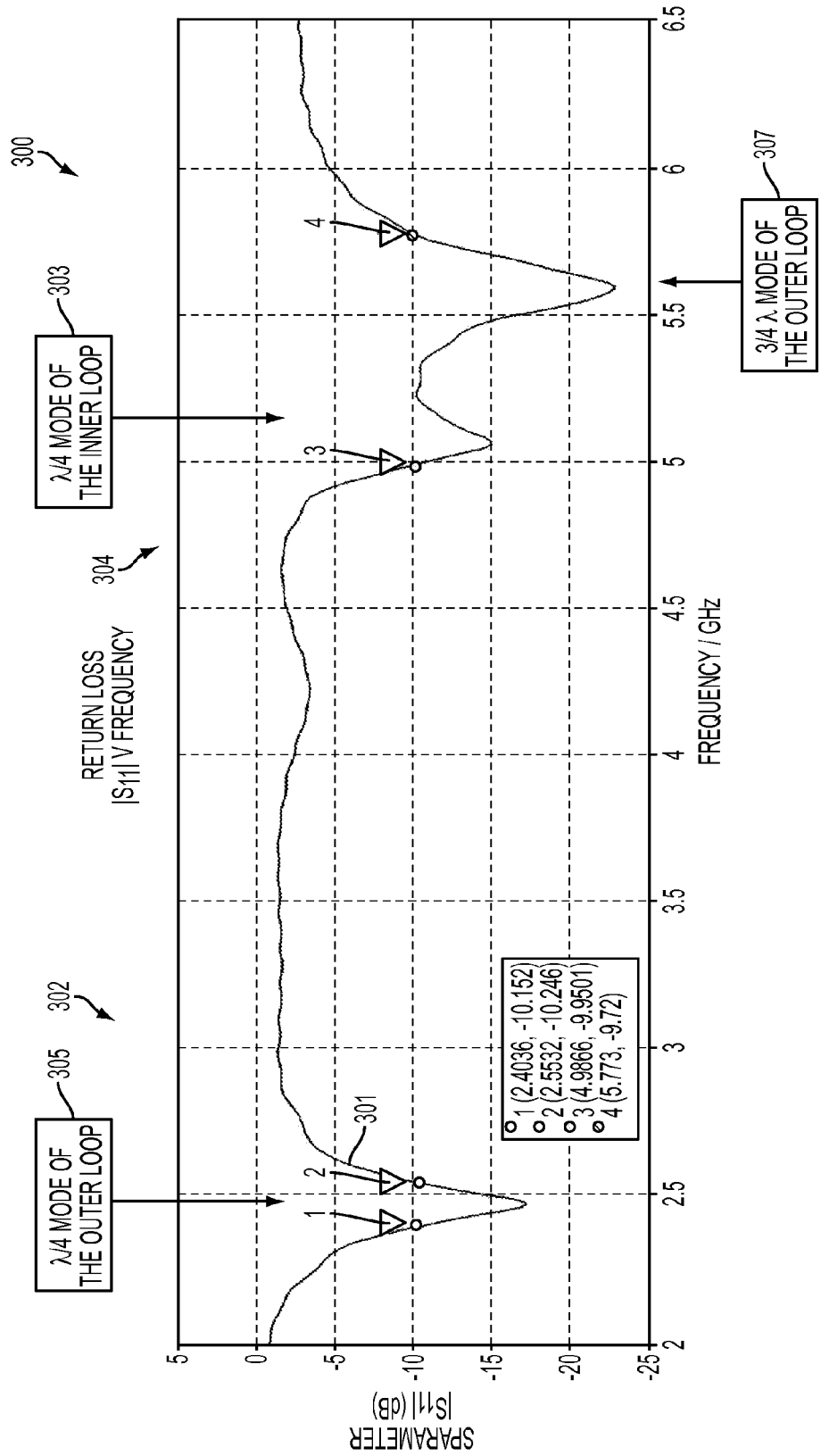
FIG. 3 is a graph of return loss of the dual-band antenna structure of FIG. 1 according to one embodiment.

FIG. 3 is a graph 300 of return loss 301 of the dual-band antenna structure 100 of FIG. 1 according to one embodiment. The graph 300 shows the return loss 301 (which can also be represented as the S-parameter or measured reflection coefficient or |S11|) of the dual-band antenna structure 100 of FIG. 1. The graph 300 illustrates that the dual-band antenna structure can be caused to radiate electromagnetic energy between approximately 2.3 GHz to approximately 2.6 GHz and between 4.9 GHz to approximately 5.9 GHz. In a low-band (LB) 302, the dual-band antenna structure 100 can operate between approximately 2.3 GHz and approximately 2.6 GHz. In a high-band (HB) 304, the dual-band antenna structure 100 can operate between approximately 4.9 GHz to approximately 5.9 GHz. The dual-band antenna structure 100 provides at least three resonant modes, including one in the low-band 302 at approximately 2.44 GHz and two in the high-band 304 at approximately 5.1 GHz and at approximately 5.6 GHz in the high-band 304. In particular, the three resonant modes include a first quarter-wave ($\lambda/4$) resonant mode 303 in the HB 304 from the inner loop element 104, a second first quarter-wave ($\lambda/4$) resonant mode 305 in the LB 302 from the outer loop element 102, as well as a third three-quarters-wave ($3/4\lambda$) resonant mode 307 in the high-band 304 from the outer loop element 102. The third three-quarters-wave ($3/4\lambda$) resonant mode 307 is a harmonic frequencies resulting from the first quarter-wave ($\lambda/4$) resonant mode 305. As described herein, other resonant modes may be achieved and the resonant modes may cover different frequency ranges and may be centered at different frequencies than those described and illustrated herein.

In other embodiments, more or less than three resonant modes may be achieved as would be appreciated by one of ordinary skill in the art having the benefit of this disclosure. It should also be noted that the first, second, and third notations on the resonant modes are not be strictly interpreted to being assigned to a particular frequency, frequency range, or elements of the antenna structure. Rather, the first, second, third, fourth and fifth notations are used for ease of description. However, in some instances, the first, second, third fourth and fifth are used to designate the order from lowest to highest frequencies. Alternatively, other orders may be achieved as would be appreciated by one of ordinary skill in the art having the benefit of this disclosure. In one embodiment, the dual-band antenna structure 100 can be configured for the LTE 700 (band 17), 1800 (band 3), 2600 (band 7), etc., UMTS, GSM (850, 800, 1800 and 1900), GPS and Wi-Fi® and Bluetooth® frequency bands. In another embodiment, the dual-band antenna structure 100 can be designed to operate in the following target bands: 1) Verizon LTE band: 746 to 787 MHz; 2) US GSM 850: 824 to 894 MHz; 3) GSM900: 880 to 960 MHz; 4) GSM 1800/DCS: 1.71 to 1.88 GHz; 5) US1900/PCS (band 2): 1.85 to 1.99 GHz; and 6) WCDMA band I (band 1): 1.92 to 2.17 GHz. Alternatively, the dual-band antenna structure 100 can be designed to operate in different combinations of frequency bands as would be appreciated by one of ordinary skill in the art having the benefit of this disclosure. Alternatively, the dual-band antenna structure 100 can be configured to be tuned to other frequency bands as would be appreciated by one of ordinary skill in the art having the benefit of this disclosure.

The dual-band antenna structure 100 can be tuned to be centered at various frequencies, such as, for examples, at approximately 2.44 GHz for a first frequency range at approximately at 5.5 GHz for a second frequency range of the dual band. The first and second frequency ranges can be tuned to be centered at other frequencies.

Figure 4:
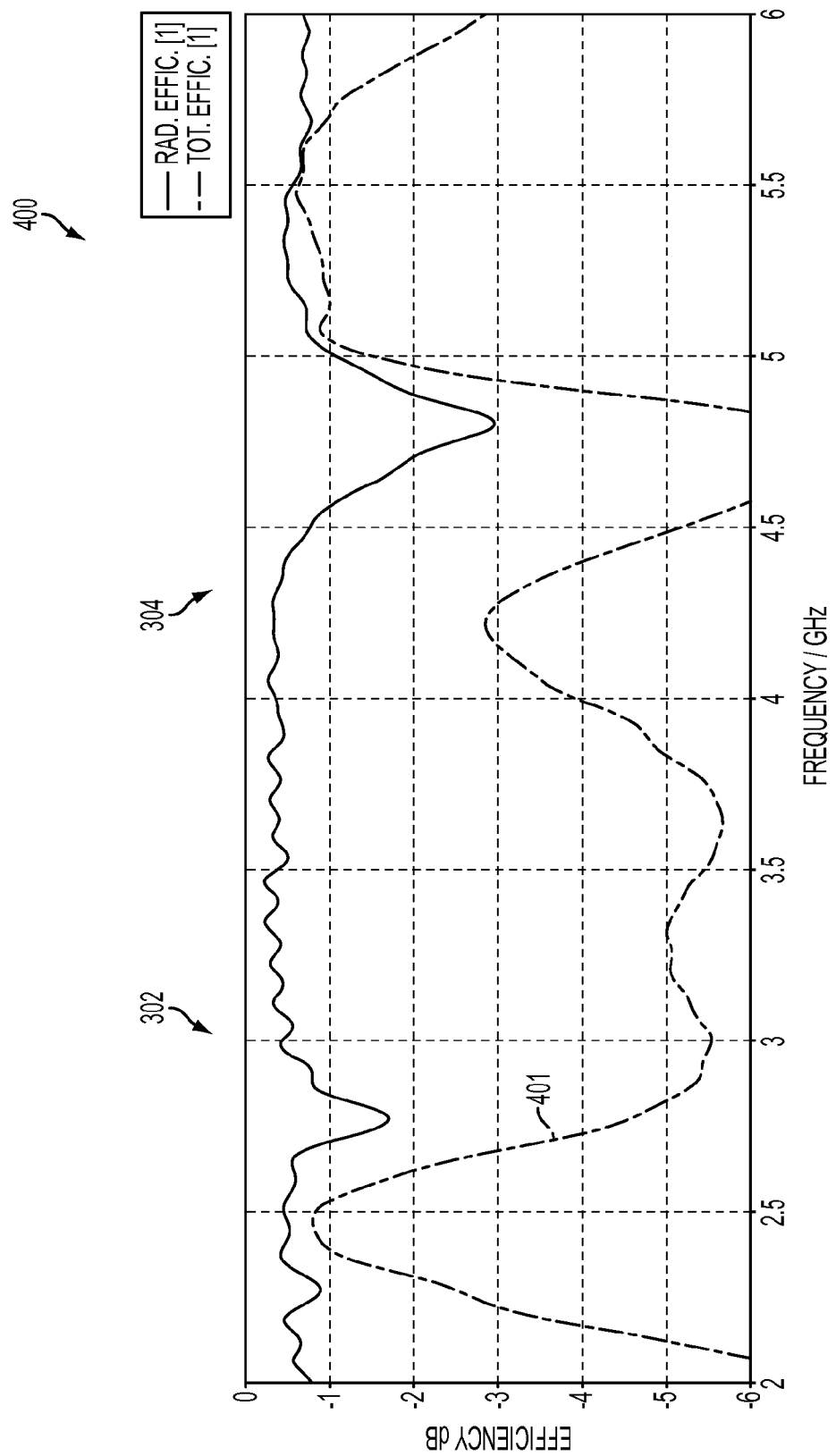
FIG. 4 is a graph of a measured efficiency of the dual-band antenna structure of FIG. 1 according to one embodiment.

FIG. 4 is a graph 400 of a measured efficiency of the dual-band antenna structure 100 of FIG. 1 according to one embodiment. The graph 400 illustrates the total efficiency 401 over a frequency range in the low-band 302 and over a frequency range in the high-band 304. The graph 400 illustrates that the dual-band antenna structure 100 is a viable antenna for the first frequency range between approximately 2.3 GHz to approximately 2.6 GHz in the low-band 302 and approximately 4.9 GHz to approximately 5.9 GHz in the high-band 304. In another embodiment, the dual-band antenna structure 100 can be configured to operate over the low-band 302 and the high-band 304 and another antenna can be configured to operate in other frequency ranges.

As would be appreciated by one of ordinary skill in the art having the benefit of this disclosure the total efficiency of the antenna can be measured by including the loss of the structure (e.g., due to mismatch loss), dielectric loss, and radiation loss. The efficiency of the antenna can be tuned for specified target bands. The efficiency of the dual-band antenna structure 100 may be modified by adjusting dimensions of the 3D structure, the gaps between the elements of the antenna structure, or any combination thereof. Similarly, 2D structures can be modified in dimensions and gaps between elements to improve the efficiency in certain frequency bands as would be appreciated by one of ordinary skill in the art having the benefit of this disclosure.

Figure 5:
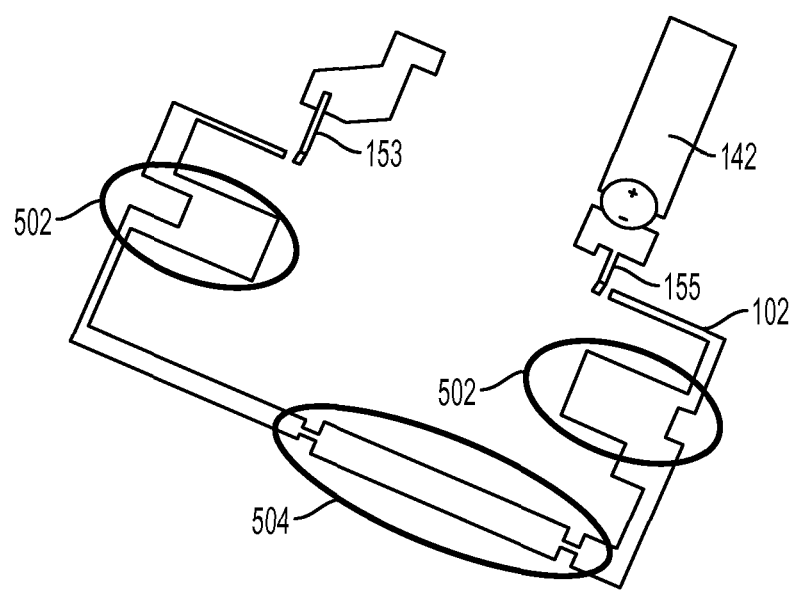
FIG. 5 is a rear view of an outer loop element of FIG. 1 according to one embodiment.

FIG. 5 is a rear view of an outer loop element 102 of FIG. 1 according to one embodiment. The outer loop element 102 is coupled to the RF feed 142 by the feeding point 155. An intervening impedance matching component (not illustrated) may be coupled between the outer loop element 102 and the feeding point 155. The outer loop element 102 has a U-shape section (or a rotated C-shape section) having various arm portions. A first arm portion extends from the feeding point 155 to a first junction in a first direction, a second arm portion extends from the first junction in a second direction towards a second junction, a third arm portion extends from the second junction in a third direction towards a third junction, a fourth arm portion that extends from the third junction in a fourth direction towards a fourth junction, and a fifth arm portion that extends from the fourth junction in the first direction towards the grounding point 153. Another intervening impedance-matching component (not illustrated) may be coupled between the grounding point 153 and the outer loop element 102. The first arm portion, the third arm portion and the fifth arm portion are parallel to the ground plane 140. The second arm portion and the fourth arm portion are perpendicular to the ground plane 140.

As illustrated in FIG. 5, the outer loop element 102 may also include one or more bends to form extension sections 502. The extension sections 502 can be used to fit the outer loop element 102 within a space-constrained volume or area. The extension sections 502 can be used in compact devices with space constraints. The outer loop element 102 may also include one or more tuning features in one or more tuning sections, such as tuning section 504. The tuning section 504 includes two sections where the conductive material is narrowed at specific distances from the RF feed 142. These two sections can be located at different locations to tune the frequency response of the outer loop element 102. In particular, there is a harmonic relationship between 2.44 GHz and 5.6 GHz. The tuning section 504 can be used to control tuning of the third harmonic in the high-band. The extension sections 502 can also be used for tuning the frequency response of the antenna structure in the high-band and in the low-band.

Figure 6:
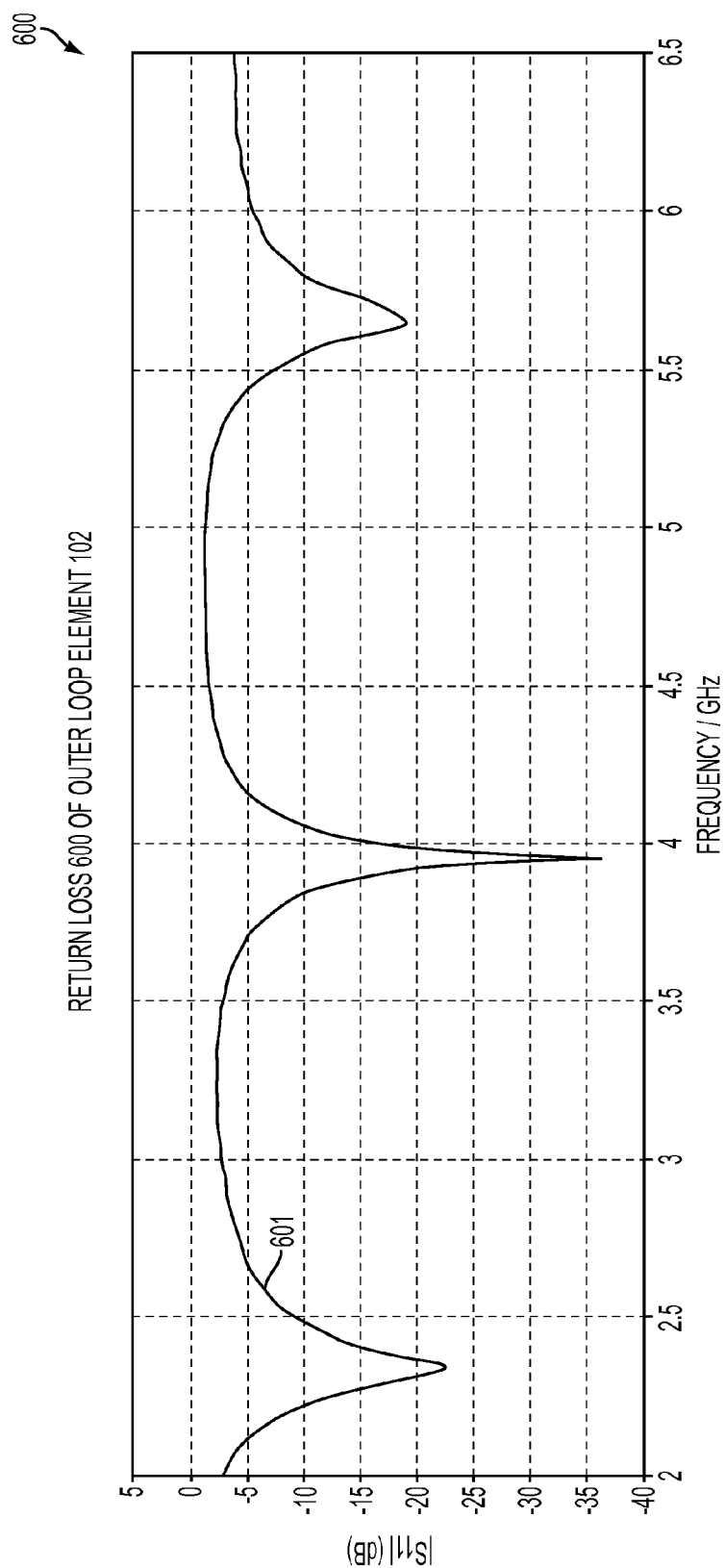
FIG. 6 is a graph of return loss of the outer loop element of FIG. 5 according to one embodiment.

FIG. 6 is a graph 600 of return loss 601 of the outer loop element 102 of FIG. 1 according to one embodiment. The graph 600 shows the return loss 601 of the outer loop element 102 of FIG. 1. The graph 600 illustrates that the outer loop element 102 can be caused to radiate electromagnetic energy at various resonant modes, such as centered at approximately 2.44 GHz, approximately 3.9 GHz, and approximately 5.6 GHz In the low-band (LB) 302, the outer loop element 102 can operate between approximately 2.3 GHz and approximately 2.6 GHz. In the high-band (HB) 304, the outer loop element 102 can operate between approximately 5.5 GHz to approximately 5.8 GHz. As described herein, other resonant modes may be achieved and the resonant modes may cover different frequency ranges and may be centered at different frequencies than those described and illustrated herein.

For some SAR tests, the user device 105 needs to be tested at 0 mm distance between the user device 105 and a phantom and result in a SAR value lower than 1.6 w/kg at 2.44 GHz with nominal RF power (e.g., 13 dBm or 0.02 Watts in a slant position). In one implementation, the outer loop element 102 results in following SAR values: of 0.66 w/kg at 2.44 GHz, 1.86 w/kg at 5.4 GHz and 2.0 w/kg at 5.5 GHz. Alternatively, other SAR values may be achieved.

Figure 7:
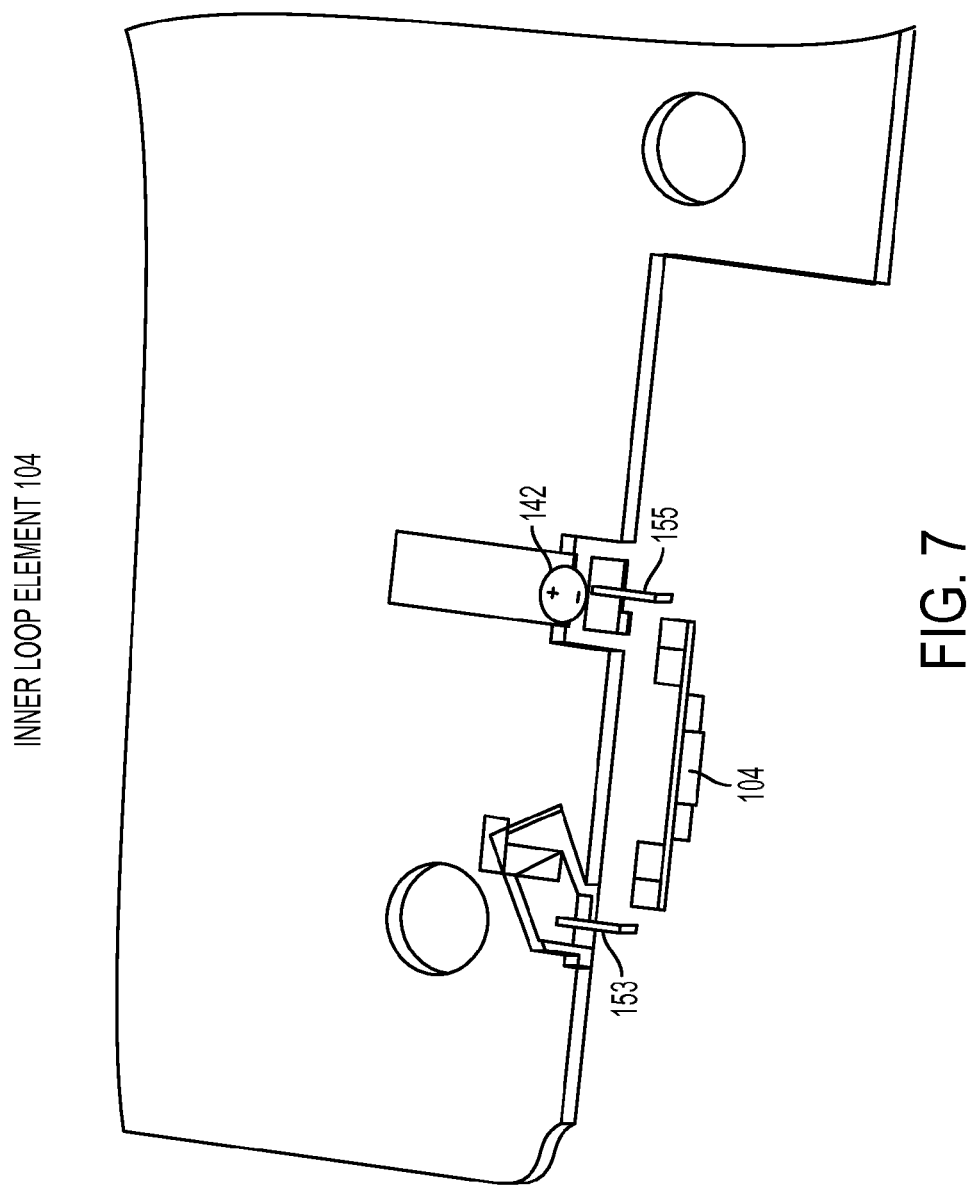
FIG. 7 is a rear view of an inner loop element of FIG. 1 according to one embodiment.

FIG. 7 is a rear view of an inner loop element 104 of FIG. 1 according to one embodiment. The inner loop element 104 is coupled to the RF feed 142 by the feeding point 155. An intervening impedance matching component (not illustrated) may be coupled between the inner loop element 104 and the feeding point 155. The inner loop element 104 has a slightly curved section (or a rotated C-shape section) coupled between the feeding point 155 and the grounding point 153. The slightly curved section can be formed to tune the frequency response in the high-band. Another intervening impedance-matching component (not illustrated) may be coupled between the grounding point 153 and the inner loop element 104.

Figure 8:
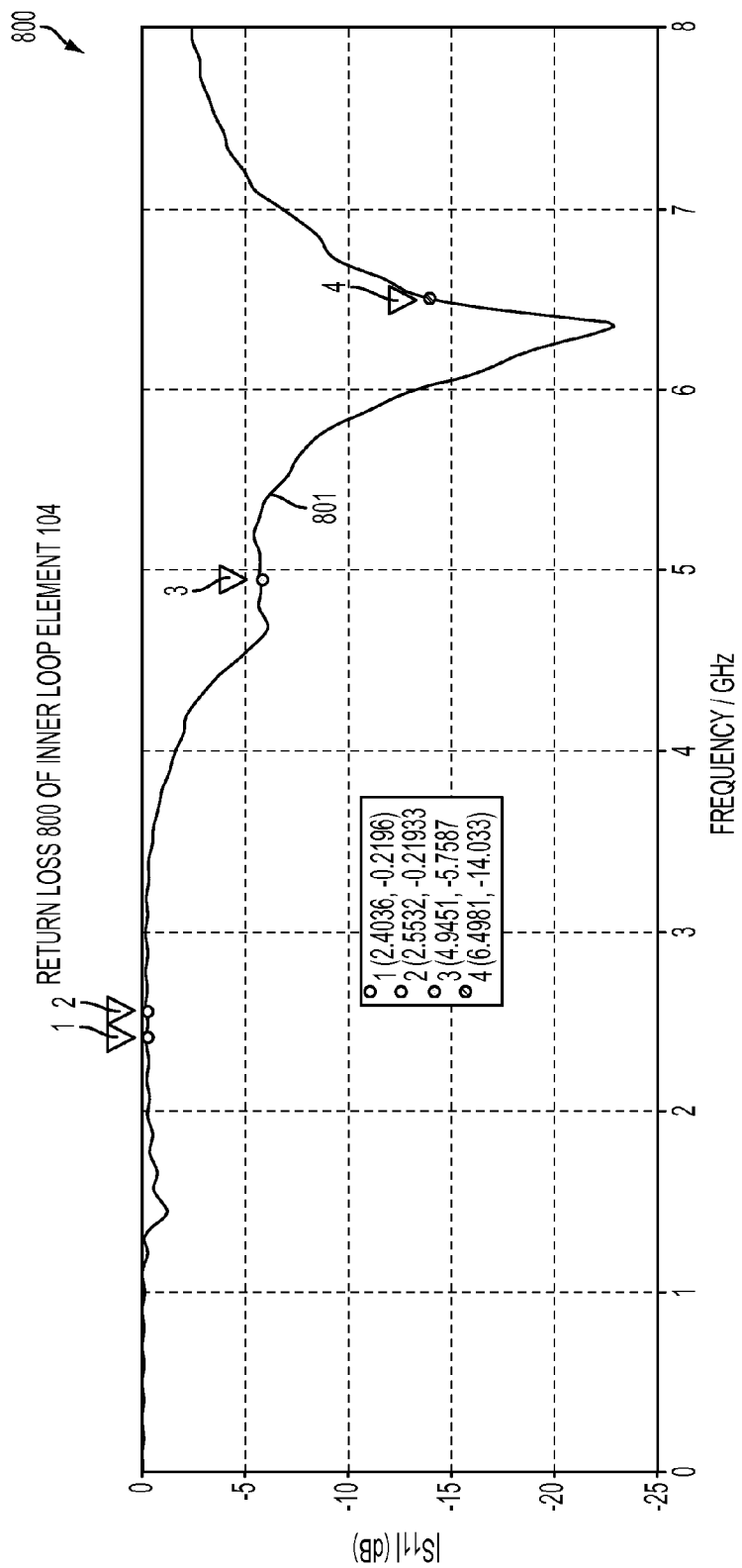
FIG. 8 is a graph of return loss of the inner loop element of FIG. 7 according to one embodiment.

FIG. 8 is a graph of return loss of the inner loop element of FIG. 7 according to one embodiment. The graph 800 shows the return loss 801 of the inner loop element 104 of FIG. 1. The graph 800 illustrates that the inner loop element 104 can be caused to radiate electromagnetic energy at one or more resonant modes, such as centered at approximately 4.9 GHz and approximately 6.3 GHz. In the high-band (HB) 304, the inner loop element 104 can operate between approximately 4.5 GHz to approximately 7 GHz. As described herein, other resonant modes may be achieved and the resonant modes may cover different frequency ranges and may be centered at different frequencies than those described and illustrated herein. Also, as described herein, by using both antenna elements in the dual-band antenna structure 100, a dual band of 2.44 GHz and 5.5 GHz may be achieved.

For some SAR tests, the user device 105 needs to be tested at 0 mm distance between the user device 105 and a phantom and result in a SAR value lower than 1.6 w/kg at 5.5 GHz with nominal RF power (e.g., 13 dBm or 0.02 Watts in a slant position). In one implementation, the inner loop element 104 results in SAR values below 1.2 w/kg between 4.7 GHz to 5.8 GHz, and 1.0 w/kg at 5.5 GHz specifically. Alternatively, other SAR values may be achieved.

Figure 9:
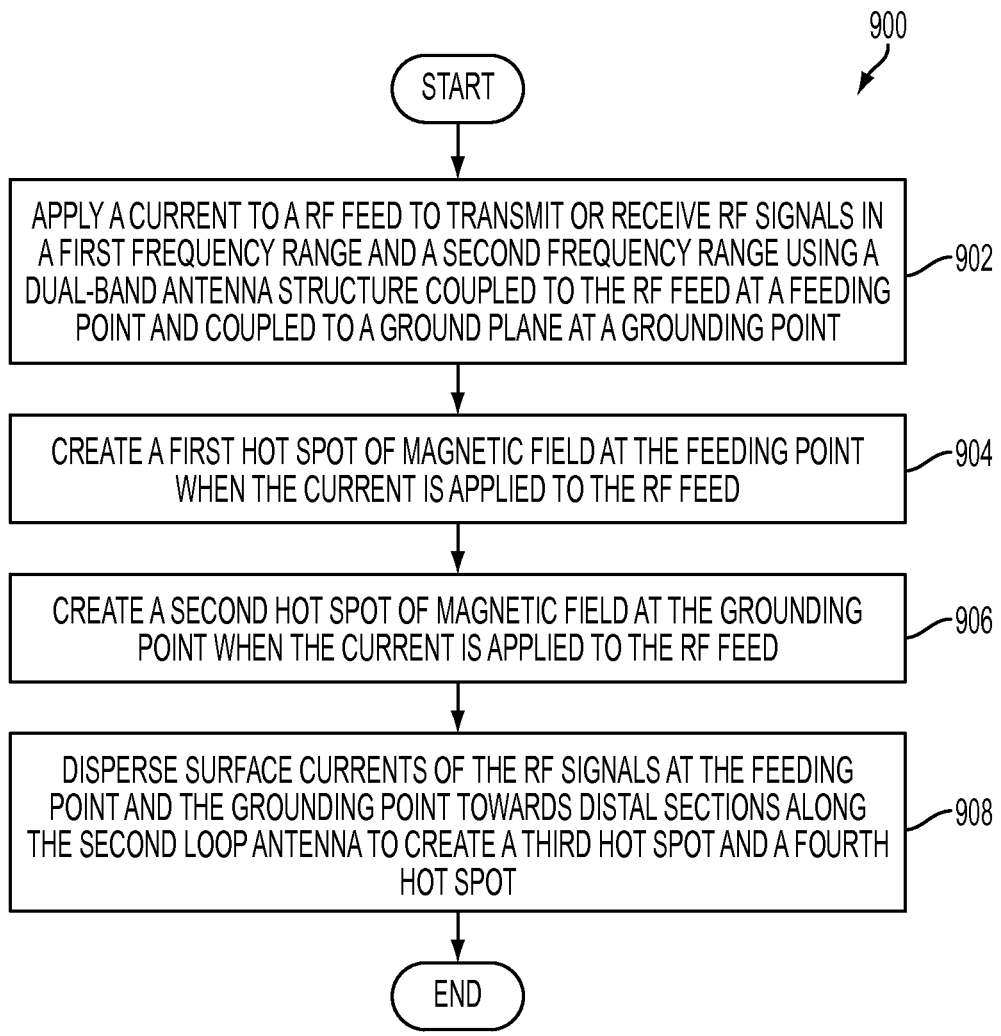
FIG. 9 is a flow diagram of an embodiment of a method of operating a user device having a dual-band antenna structure according to one embodiment.

FIG. 9 is a flow diagram of an embodiment of a method 900 of operating an electronic device having a dual-band antenna structure according to one embodiment. In method 900, a current is applied to a RF feed to transmit or receive RF signals in a frequency range using a dual-band antenna structure coupled to the RF feed at a feeding point 155 and coupled to a ground plane at a grounding point 153 (block 902). The current applied to the RF feed creates surface currents on the dual-band antenna structure. The dual-band antenna structure includes a first loop antenna and a second loop antenna. When the current is applied to the RF feed, a first hot spot of magnetic field is created at the feeding point (block 904), and a second hot spot of magnetic field is created at the grounding point (block 906). The second loop antenna disperse a portion of the surface currents at the feeding point and a portion of the surface currents at the grounding point towards distal sections along the second loop antenna to create a third hot spot and a fourth hot spot (block 908). The first, second, third and fourth hot spots are areas of the dual-band antenna structure and surface-current density on the first, second, third and fourth hot spot areas is higher than on an area surrounding the first, second, third, and fourth hot spot areas. The distal sections are located farther away from sections of the dual-band antenna structure coupled to the feeding point and the grounding point.

In a further embodiment, applying the current at RF feed causes the dual-band antenna structure to radiate energy in a first resonant mode in the first frequency range, a second resonant mode in a second frequency range, and a third resonant mode in the second frequency range when the RF signals are applied to the RF feed. In one embodiment, the first resonant mode is centered at approximately 5.1 GHz, the second resonant mode is centered at approximately 2.44 GHz, the third resonant mode is centered at approximately 5.6 GHz In one embodiment, the first frequency range is approximately 2.3 GHz to approximately 2.6 GHz and the second frequency range is approximately 4.9 GHz to approximately 5.9 GHz. Alternatively, other frequency ranges may be achieved. In response to the applied current, when applicable, the dual-band antenna structure radiates electromagnetic energy to communicate information to one or more other devices. Regardless of the antenna configuration, the magnetic field forms a radiation pattern. The radiation pattern may be various shapes as would be appreciated by one of ordinary skill in the art having the benefit of this disclosure. Alternatively, other frequency ranges may be achieved as described herein.

Figure 10:
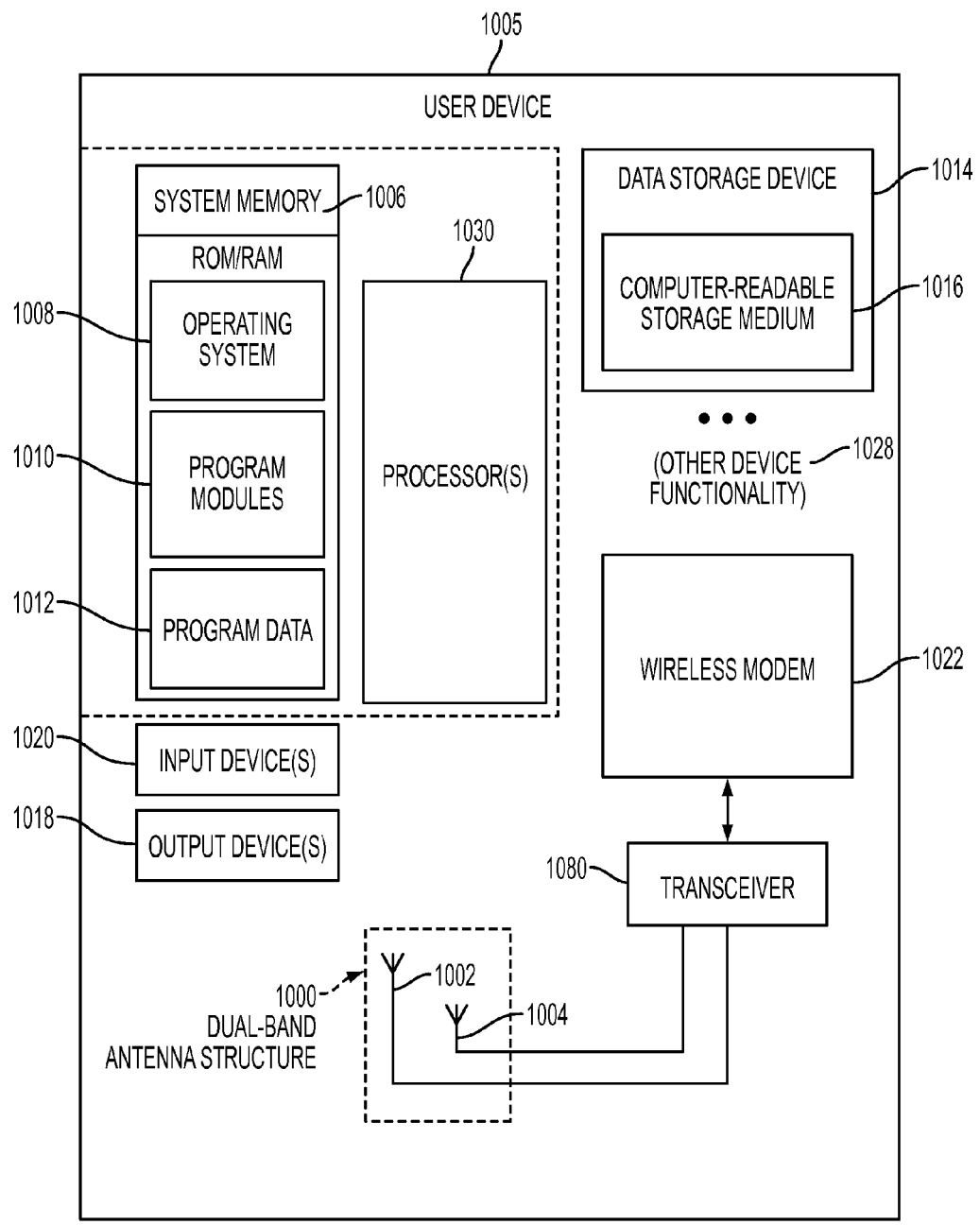
FIG. 10 is a block diagram of a user device in which embodiments of a dual-band antenna structure may be implemented.

FIG. 10 is a block diagram of a user device 1005 having the dual-band antenna structure 1000 according to one embodiment. The user device 1005 includes one or more processors 1030, such as one or more CPUs, microcontrollers, field programmable gate arrays, or other types of processing devices. The user device 1005 also includes system memory 1006, which may correspond to any combination of volatile and/or non-volatile storage mechanisms. The system memory 1006 stores information, which provides an operating system component 1008, various program modules 1010, program data 1012, and/or other components. The user device 1005 performs functions by using the processor(s) 1030 to execute instructions provided by the system memory 1006.

The user device 1005 also includes a data storage device 1014 that may be composed of one or more types of removable storage and/or one or more types of non-removable storage. The data storage device 1014 includes a computer-readable storage medium 1016 on which is stored one or more sets of instructions embodying any one or more of the functions of the user device 1005, as described herein. As shown, instructions may reside, completely or at least partially, within the computer-readable storage medium 1016, system memory 1006 and/or within the processor(s) 1030 during execution thereof by the user device 1005, the system memory 1006 and the processor(s) 1030 also constituting computer-readable media. The user device 1005 may also include one or more input devices 1020 (keyboard, mouse device, specialized selection keys, etc.) and one or more output devices 1018 (displays, printers, audio output mechanisms, etc.).

The user device 1005 further includes a wireless modem 1022 to allow the user device 1005 to communicate via a wireless network (e.g., such as provided by a wireless communication system) with other computing devices, such as remote computers, an item providing system, and so forth. The wireless modem 1022 allows the user device 1005 to handle both voice and non-voice communications (such as communications for text messages, multimedia messages, media downloads, web browsing, etc.) with a wireless communication system. The wireless modem 1022 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1×RTT), evaluation data optimized (EVDO), high-speed downlink packet access (HSDPA), WLAN (e.g., Wi-Fi® network), etc. In other embodiments, the wireless modem 1022 may communicate according to different communication types (e.g., WCDMA, GSM, LTE, CDMA, WiMax, etc.) in different cellular networks. The cellular network architecture may include multiple cells, where each cell includes a base station configured to communicate with user devices within the cell. These cells may communicate with the user devices 1005 using the same frequency, different frequencies, same communication type (e.g., WCDMA, GSM, LTE, CDMA, WiMax, etc.), or different communication types. Each of the base stations may be connected to a private, a public network, or both, such as the Internet, a local area network (LAN), a public switched telephone network (PSTN), or the like, to allow the user devices 1005 to communicate with other devices, such as other user devices, server computing systems, telephone devices, or the like. In addition to wirelessly connecting to a wireless communication system, the user device 1005 may also wirelessly connect with other user devices. For example, user device 1005 may form a wireless ad hoc (peer-to-peer) network with another user device.

The wireless modem 1022 may generate signals and send these signals to transceiver 1080 for amplification, after which they are wirelessly transmitted via the dual-band antenna structure 1000, including two loop elements: outer loop element 1002 and inner loop element 1004. Although FIG. 10 illustrates the transceivers 1080, in other embodiments, a power amplifier (power amp) may be used dual-band antenna structure 1000 to transmit and receive RF signal. Or, receivers may be used instead of transceivers, such as a GPS receiver. The dual-band antenna structure 1000 may be any directional, omnidirectional or non-directional antenna in a different frequency band. In addition to sending data, the dual-band antenna structure 1000 also can receive data, which is sent to wireless modem 1022 and transferred to processor(s) 1030. The user device 1005 may include zero or more additional antennas (not illustrated) other than the dual-band antenna structure 1000. When there are multiple antennas, the user device 1005 may also transmit information using different wireless communication protocols. It should be noted that, in other embodiments, the user device 1005 may include more or less components as illustrated in the block diagram of FIG. 10. In one embodiment, the dual-band antenna structure 1000 is the dual-band antenna structure 100 of FIG. 1 and the outer loop element 1002 is the outer loop element 102 of FIG. 1 and the inner loop element 1004 is the inner loop element 104 of FIG. 1. Alternatively, the dual-band antenna structure 1000 may be other variants of the dual-band antenna structures as described herein.

In one embodiment, the user device 1005 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hot spot and a connection to a wireless carrier system. In one embodiment, the first wireless connection is associated with a first resonant mode of the dual-band antenna structure 1000 that operates at a first frequency band and the second wireless connection is associated with a second resonant mode of the dual-band antenna structure 1000 that operates at a second frequency band. In another embodiment, the first wireless connection is associated with the first antenna element 1002 of the dual-band antenna structure 1000 and the second wireless connection is associated with a second antenna (not illustrated). In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a wireless modem 1022 is shown to control transmission and reception via dual-band antenna structure 1000, the user device 1005 may alternatively include multiple wireless modems, each of which is configured to transmit/receive data via a different antenna and/or wireless transmission protocol.

The user device 1005 delivers and/or receives items, upgrades, and/or other information via the network. For example, the user device 1005 may download or receive items from an item providing system. The item providing system receives various requests, instructions and other data from the user device 1005 via the network. The item providing system may include one or more machines (e.g., one or more server computer systems, routers, gateways, etc.) that have processing and storage capabilities to provide the above functionality. Communication between the item providing system and the user device 1005 may be enabled via any communication infrastructure. One example of such an infrastructure includes a combination of a wide area network (WAN) and wireless infrastructure, which allows a user to use the user device 1005 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hot spot connected with the network. The WLAN hot spots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1005.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1005 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
   a radio frequency (RF) feed; and
   a dual-band antenna structure coupled to the RF feed at a feeding point and coupled to a ground plane at a grounding point,
   wherein the dual-band antenna structure comprises:
      a first loop antenna coupled to the feeding point and the grounding point; and
      a second loop antenna coupled to the feeding point and the grounding point,
   wherein the ground plane comprises a first edge and a second edge that collectively form a cutout area in which the first loop antenna and the second loop antenna are coplanar and disposed in a same plane as the ground plane,
   wherein the second loop antenna comprises a first section where conductive material of the second loop antenna has a first width and a second section where the conductive material of the second loop antenna has a second width, the first width and the second width being less than a width of other sections of the second loop antenna, wherein the first section is located a first distance from the RF feed and the second section is located at a second distance from the RF feed,
   wherein, the first loop antenna is to radiate electromagnetic energy in a first resonant mode in a first frequency band and the second loop antenna is to radiate electromagnetic energy in a second resonant mode in a second frequency band of the dual-band antenna structure, the first frequency band being higher than the second frequency band,
   wherein the second loop antenna, when RF signals are applied to the RF feed to radiate electromagnetic energy in the first resonant mode, disperses portions of surface current to create three or more areas on the dual-band antenna structure at which surface-current density is higher than at areas surrounding the three or more areas, and
   wherein a first area of the three or more areas is located at the feeding point, a second area of the three or more areas is located at the grounding point, and a third area of the three or more areas is located at the second section.

2. The apparatus of claim 1, wherein the second loop antenna comprises a U-shape outer-loop structure comprising a first end coupled to the feeding point, a second end coupled to the grounding point, a first junction, and a second junction, wherein the first loop antenna is disposed at least partially within an inner area defined by the U-shape outer-loop structure, wherein the third area is located at the first junction of the U-shape outer-loop structure, and wherein a fourth area of the three or more areas is located at the second junction of the U-shape outer-loop structure.

3. The apparatus of claim 2, wherein surface currents applied at the feeding point create the first area at the feeding point and the second area at the grounding point and the U-shape outer-loop structure disperses a portion of the surface currents at the feeding point and a portion of the surface currents at the grounding point to create the third area and the fourth area.

4. The apparatus of claim 1, wherein the second loop antenna comprises:
   a first arm portion that extends from the feeding point to a first junction in a first direction;
   a second arm portion that extends from the first junction in a second direction towards a second junction;
   a third arm portion that extends from the second junction in a third direction towards a third junction;
   a fourth arm portion that extends from the third junction in a fourth direction towards a fourth junction; and
   a fifth arm portion that extends from the fourth junction in the first direction towards the grounding point, wherein the first arm portion, the third arm portion and the fifth arm portion are parallel to the ground plane, and wherein the second arm portion and the fourth arm portion are perpendicular to the ground plane.

5. The apparatus of claim 4, wherein the first loop antenna is disposed between the first arm portion and the fifth arm portion of the second loop antenna.

6. The apparatus of claim 4, wherein the dual-band antenna structure further comprises a plurality of impedance-matching components, wherein the plurality of impedance-matching components comprises:
   a first component coupled in series between the feeding point and the first arm portion of the second loop antenna;
   a second component coupled in series between the fifth arm of the second loop antenna and the grounding point;
   a third component coupled in series between the feeding point and a first end of the second loop antenna;
   a fourth component coupled in series between the grounding point and a second end of the second loop antenna; and
   a fifth component coupled between the feeding point and the ground plane.

7. The apparatus of claim 6, wherein the first component is a resistor, the second component is a first capacitor, the third component is a second capacitor, the fourth component is a third capacitor, and the fifth component is an inductor.

8. The apparatus of claim 6, wherein the first, second, third, fourth, and fifth components are discrete components or conductive traces with capacitive or inductive properties.

9. The apparatus of claim 1, wherein the first loop antenna and the second loop are quarter-wave antennas, and wherein the first frequency band is approximately 2.3 GHz to approximately 2.6 GHz and the second frequency band is approximately 5.0 GHz to approximately 6.0 GHz.

10. The apparatus of claim 1, wherein the first resonant mode is centered at approximately 5.1 GHz and the second resonant mode is centered at approximately 2.44 GHz.

11. The apparatus of claim 1, wherein the feeding point and the grounding point are at least 5 mm apart.

12. The apparatus of claim 1, further comprising a transceiver coupled to the RF feed, the transceiver to communicate data via the dual-band antenna structure, wherein the second loop antenna is coupled to the feeding point at a proximal end of the second loop antenna and coupled to the ground plane at a grounding point at a distal end of the second loop antenna, the distal end of the second loop antenna being the farthest end from the RF feed, wherein the first loop antenna is coupled to the RF feed at the feeding point at a proximal end of the first loop antenna and coupled to the ground plane at the grounding point at a distal end of the first loop antenna, the distal end of the first loop antenna being the farthest end from the RF feed, and wherein the first loop antenna is disposed at least partially within an inner area defined by the second loop antenna.

13. The apparatus of claim 1, further comprising:
a first extension area that extends inwards from an outer perimeter of the second loop antenna at a first side of the second loop antenna; and
a second extension area that extends inward from the outer perimeter of the second loop antenna at an opposing side of the second loop antenna.

14. The apparatus of claim 1, wherein the first loop antenna radiates electromagnetic energy in a first quarter-wave resonant mode in a first band of the dual-band antenna structure when the RF signals are applied to the RF feed, wherein the second loop antenna radiates electromagnetic energy in a second quarter-wave resonant mode in a second band of the dual-band antenna structure and radiates electromagnetic energy in a third three-quarters-wave resonant mode in the first band of the dual-band antenna structure when the RF signals are applied to the RF feed, and wherein the first band is higher than the second band.

15. An apparatus comprising:
a radio frequency (RF) feed; and
an antenna structure comprising:
a ground plane;
a first loop element coupled to the RF feed at a feeding point and coupled to the ground plane at a grounding point; and
a second loop element coupled to the RF feed at the feeding point and coupled to the ground plane at the grounding point, wherein the second loop element comprise portions of a conductive trace disposed along four sides of a rectangular shape, wherein a first portion of the conductive trace at a first side comprises a first extension area of conductive material that extends inward from an outer perimeter of the second loop element, wherein a second portion of the conductive trace at a second side comprises a second extension area of conductive material that extends inward form the outer perimeter of the second loop element, wherein the first side and the second side are opposing sides, and wherein a third portion of the conductive trace comprises a first section where the conductive material of the second loop element has a first width and a second section where the conductive material of the second loop element has a second width, the first width and the second width being less than a width of other sections of the second loop element.

16. The apparatus of claim 15, wherein the ground plane comprises a first edge and a second edge that collectively form a cutout area in which the first loop element and the second loop element are disposed in a same plane as the ground plane.

17. The apparatus of claim 15, further comprising a transceiver coupled to the RF feed, wherein the transceiver is to radiate electromagnetic energy in a first resonant mode in a first frequency band using the first loop element and is to radiate electromagnetic energy in a second resonant mode in a second frequency band using the second loop element, the first frequency band being higher than the second frequency band.

18. The apparatus of claim 15, further comprising a transceiver coupled to the RF feed, wherein the transceiver is to radiate electromagnetic energy in a first resonant mode in a first frequency range using the first loop element, radiate electromagnetic energy in a second resonant mode in a second frequency range using the second loop element, and radiate electromagnetic energy in a third resonant mode in the first frequency range using the second loop element, the first frequency range being higher than the second frequency range.

19. The apparatus of claim 18, wherein the first resonant mode is centered at approximately 5.1 GHz, the second resonant mode is centered at approximately 2.44 GHz, the third resonant mode is centered at approximately 5.6 GHz.

20. The apparatus of claim 18, wherein the first frequency range is approximately 2.3 GHz to approximately 2.6 GHz and the second frequency range is approximately 5.0 GHz to approximately 6.0 GHz.

21. The apparatus of claim 15, wherein:
the first loop element radiates electromagnetic energy in a first quarter-wave resonant mode in a first band of the antenna structure when RF signals are applied to the RF feed; and
the second loop element radiates electromagnetic energy in a second quarter-wave resonant mode in a second band of the antenna structure and radiates electromagnetic energy in a third three-quarters-wave resonant mode in the first band when the RF signals are applied to the RF feed, wherein the first band is higher than the second band.

22. The apparatus of claim 15, wherein the second loop element, when RF signals are applied to the RF feed to radiate electromagnetic energy, disperses portions of surface current to create three or more areas on the antenna structure at which surface-current density is higher than at areas surrounding the three or more areas.

23. The apparatus of claim 22, wherein a first area of the three or more areas is located at the feeding point, a second area of the three or more areas is located at the grounding point, and a third area of the three or more areas is located at the second section.

* * * * *